United States Patent [19]

Klett et al.

[11] Patent Number: 5,219,656
[45] Date of Patent: Jun. 15, 1993

[54] CHEMICALLY TREATED GLASS FIBERS FOR REINFORCING POLYMERIC MATERIALS

[75] Inventors: Michael W. Klett, Allison Park; Kenneth D. Beer, Vandergrift, both of Pa.

[73] Assignee: PPG Industries Inc., Pittsburgh, Pa.

[21] Appl. No.: 729,747

[22] Filed: Jul. 12, 1991

[51] Int. Cl.$^5$ .............. D02G 3/00; B32B 9/00
[52] U.S. Cl. ................ 428/378; 428/391; 523/205; 523/206
[58] Field of Search .......... 428/378, 391; 523/205, 523/206

[56] References Cited

U.S. PATENT DOCUMENTS

| | | | |
|---|---|---|---|
| 4,405,746 | 9/1983 | Girgis | 524/501 |
| 4,473,618 | 9/1984 | Adzima et al. | 428/378 |
| 4,659,753 | 4/1987 | Tiburtius et al. | 523/209 |
| 4,752,527 | 6/1988 | Sanzero et al. | 428/391 |
| 4,990,549 | 2/1991 | Delvin et al. | 523/209 |
| 5,086,101 | 2/1992 | Garrett et al. | 524/188 |

*Primary Examiner*—Jenna L. Davis
*Assistant Examiner*—Chris Raimund
*Attorney, Agent, or Firm*—James B. Robinson; Kenneth J. Stachel

[57] ABSTRACT

A unique composition of matter useful for treating glass fibers is claimed containing a film forming polymer, an organo coupling agent, a filament lubricant and an allylic compound, such as triallylcyanurate. The glass fibers carrying the dried residue of an aqueous chemical treating composition containing the unique chemical treating composition can be used to prepare a thermosetting plastic composite having improved strength. The composites so prepared are useful in making clear, translucent panels of improved weatherability and pultrusion profiles having higher strengths, such as compressive, shear and flexural strengths.

25 Claims, No Drawings

CHEMICALLY TREATED GLASS FIBERS FOR REINFORCING POLYMERIC MATERIALS

The present application is directed to glass fibers treated with an aqueous chemical treating composition, said fibers being ideal for use in reinforcing thermosetting polymeric matrices for improving the composite strength thereof.

The reinforced plastic industry has been using glass fibers in various forms for reinforcing polymeric matrices to produce myriad products. For instance, glass fibers have been used in the form of continuous and chopped filaments and strands and rovings and woven and nonwoven fabrics to reinforce polymers. For example, thermosetting polymeric matrices have been reinforced with the various forms of glass fibers in producing such products as sheet molding compounds, bulk molding compounds, pultrusion products, panel products, spray up molding products and the like molding products.

In producing glass fibers for the polymeric reinforcement market, the glass fibers are attenuated from molten streams of fiberizable glass material from a bushing or a like device connected to a furnace containing molten fiberizable glass material. The glass fibers are attenuated by a winder, which collects gathered filaments into a package, or by rollers, which pull the fibers before they are collected and chopped. In the process of producing glass fibers, a chemical treating composition is applied to them shortly after they are attenuated as the molten streams of glass. The chemical treating composition is usually an aqueous composition traditionally containing film forming materials, coupling agents and lubricants. The chemical treating composition is needed to retard inter filament abrasion of the glass fibers when they are gathered into a bundle of glass fibers or strands and to make the glass fibers compatible with polymer matrices that they are to reinforce. Typically, the chemically treated glass fibers are dried either in the package form or in the chopped strand form before they are used for reinforcing polymeric matrices.

Glass fiber reinforced polymer matrices, such as pultruded profiles and/or clear or translucent panels, are commonly used outdoors or in corrosive environments. Applications of pultruded composites include ladder rails, sucker rods, antennas, railings, conduits, I-beams, H-beams and angles. Clear or translucent reinforced plastic panel applications include solar collectors, sky lights, artificial light fixture covers, patio covers, highway signs and markings, green house glazings and the like.

Problems associated with fiber reinforced thermosetting plastics is their susceptibility to weathering and corrosion attack, resulting in the reduction of their composite strength. For example, with clear or translucent panels the weathering problem manifests itself in the formation of white fibers, known in the industry as "fiber bloom". With pultrusion profiles, premature mechanical failure occurs due to the separation of the glass fibers from the polymeric matrix, specifically noted in the loss of shear strength.

In U.S. Pat. No. 4,990,549 Delvin et al there is disclosed a thermoplastic resin composition containing (a) a thermoplastic polyester resin and (b) a glass fiber reinforcing agent treated with a sizing agent comprising a di- or tri-functional cyanurate or isocyanurate. The sizing agent is said to include, as an optional component, a film former and a coupling agent. The presence of the cyanurate on the glass fiber surface is said to result in a fiber reinforced thermoplastic composites of increased strength.

It is an object of the present invention to provide chemically treated glass fibers that are processable into glass fiber reinforced plastics.

SUMMARY OF THE INVENTION

The invention defined and claimed herein is directed to (1) a unique chemical treating composition for treating glass fibers; (2) glass fiber strands having a plurality of glass fibers having at least a portion of their surfaces covered with the dried residue of said unique chemical treatment; (3) a process for producing glass fiber reinforced thermosetting polymeric composites, particularly unsaturated polyester, vinyl ester and epoxy resin composites; and (4) the resulting thermosetting polymeric composites.

The unique chemical treatment is an aqueous treating composition having four necessary nonaqueous components. One of the nonaqueous components, a film former, is selected from one or more aqueous soluble, dispersible or emulsifiable epoxy resins or a Bisphenol A-type polyester, either alone or as a blend. Another of the nonaqueous components is one or more acryloxy- or methacryloxy-containing organo coupling agents. The third necessary nonaqueous component is a filament lubricant, such as a hydrocarbon wax or a cationic lubricant, such as polyalkylene imines partially amidated with fatty acids, one of which that may be pelargonic acid. The fourth necessary component is one or more allylic compounds, defined more specifically hereinafter, particularly triallylcyanurate. The presence of the latter components is particularly critical to improve composite strengths and long-term panel clarity especially of thermosetting polymers.

In addition to the above, the chemical treatment can contain other components normally present in glass sizing compositions. For example, present therein can be one or more antistatic agents, for example, quaternary ammonium salts having one or more alkoxy moieties in an effective antistatic amount. Another optional component in the composition of matter is a crosslinking agent (hardener), such as one or more melamine formaldehyde resins. An additional optional component, particularly in enhancing panel clarity, is one or more antioxidants, such as thioethers, hindered phenols or quinones.

When the chemical treatment is used in coating glass fiber surfaces, water will also be present in the mixture in an amount sufficient to allow the glass fibers to be treated.

In one aspect of the invention, the chemical treatment is applied to glass fibers, produced from any fiberizable glass composition, and the fibers are produced into chopped strands or multilayered packages of continuous strands. In a preferred aspect of the invention, the fiberizable glass composition may be composed of materials to result in glass fibers having a low refraction index in the range of 1.5495–1.5740. These sized glass fibers can reinforce appropriate polymeric matrices to produce translucent, and if desired, clear glass fiber reinforced polymeric panels. The translucent glass fiber reinforced polymeric panels have glass fibers that are not plainly apparent and do not detract from weatherability.

DETAILED DESCRIPTION OF THE INVENTION AND PREFERRED EMBODIMENT

In the production of glass fiber reinforced polymeric materials, the glass fibers must have particular characteristics. The characteristics that are necessary for the glass fibers to be used in such matrix polymers for producing such products include one or more of the following characteristics: good choppability or dispersibility in the matrix polymer, good solubility in the matrix polymer for fast wet-out, low fiber prominence, low degree of white fibers (good clarity) and good weatherability in the cured fiber reinforced product (FRP). For the choppability of the glass fibers in the form of bundles of glass fibers or strands of gathered glass fibers, the resulting bundles and/or strands should not have strand to strand adhesion, commonly referred to in the industry as "matchsticking". Such a characteristic of the glass fiber bundles or strands would result in poor wet-out of the glass fibers in the polymeric matrix. The glass fibers of the present invention are most suitable for use in pultrusion profiles and in forming clear and translucent panels of glass fiber reinforced polymeric materials, such as unsaturated polyesters, vinyl esters and epoxies.

In addition, the chemically treated glass fibers of the present invention can also be used in any polymeric matrix including filled and pigmented systems, where there is a desire to have the fast wet-out of the glass fibers in the polymeric matrix. "Wet-out" means that the matrix polymer encapsulates the glass fibers and very little, if any, bare glass is visible throughout the cured fiber reinforced polymeric material, hereinafter referred to as "composite". Wet-out during production of the glass fiber composite is a measure of the apparent intimacy of contact between the polymeric matrix and the glass fibers. If the glass fibers are not intimately wet-out following the application of the glass fibers to the polymeric matrix, this may affect the fiber-resin interface, which manifests itself adversely as low composite strengths and appearance of white fibers. For instance, in processing of panels of composite, the wet-out of the chopped glass fiber strand or bundles of fibers must occur within a short time before the polymeric matrix containing the chopped glass fibers is cured in a processing line. Therefore, the wet out rate for the fibers is an important criteria in producing such products as clear or translucent panels. Any retardation of the wet-out rate for the chopped glass fiber strands would not be advantageous in the processing of panels of composites. Thus the chemically treated fibers of the present invention are eminently suited in producing weatherable, fiber reinforced polymeric panels.

Film forming polymers suitable for use herein in the preparation of the novel composition of matter are well known in the art. Nonexclusive examples of such film forming polymers include an aqueous soluble, dispersible, or emulsifiable epoxy resins and/or bisphenol A-type polyester resins, such as one formed from bisphenol A, butene diol or maleic anhydride or maleic acid and adipic acid with internal and/or external emulsification through the use of a polyalkylene polyol, such as polyethylene glycol. Further examples of film forming polymers for use herein, and the amounts thereof used, which are generally effective film forming amounts, are exemplified in column 4, lines 50 to 68, column 5, lines 1 to 68, column 6, lines 1 to 68, and column 7, lines 1 to 23, of U.S. Pat. No. 4,752,527 of Sanzero et al, which description is hereby incorporated herein by reference.

Similarly, lubricants useful herein in the preparation of the novel composition of matter are well known in the art. Nonexclusive examples of such lubricants include hydrocarbon waxes, acid solubilized fatty acid amides, such as formic acid, as well as anhydrous acid solubilized polymers of the lower molecular weight unsaturated fatty acid amides. Further examples of lubricants suitable herein, and the amounts thereof used, which are generally effective fiber lubricating amounts are exemplified in column 8, lines 5 to 47, of U.S. Pat. No. 4,752,527 of Sanzero et al, which description is also hereby incorporated herein by reference.

Coupling agents suitable for use herein in the preparation of the unique composition of matter are also well known in the art. Nonexclusive examples of such coupling agents include an acryloxy-containing or methacryloxy-containing organofunctional compound, such as methacryloxy alkyl trialkoxy silane in unhydrolyzed, hydrolyzed or partially hydrolyzed form. Further examples of suitable coupling agents, and the amounts thereof used, which are generally effective coupling agent amounts, are also exemplified in column 7, lines 24 to 68, and column 8, lines 1 to 4 of U.S. Pat. No. 4,752,527 of Sanzero et al, which description is hereby incorporated herein by reference.

The last required component in the unique composition herein is an allylic compound defined by the following structural formula:

$$B\text{-}Z_{n1}, \qquad \text{(Formula 1)}$$

wherein Z represents the following moiety:

$$\left[ -(A)_{n2} - \underset{R^1}{\overset{H}{\underset{|}{C}}} - \underset{}{\overset{H}{\underset{|}{C}}} = \underset{H}{\overset{H}{\underset{|}{C}}} - \right] \qquad \text{(Formula 2)}$$

and B is selected from the group consisting of the following moieties:

(1) a cyanurate defined by the following structural formula:

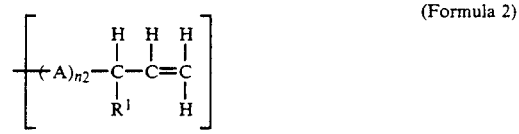

(Formula 3)

(2) an aromatic moiety defined by the following structural formula:

(Formula 4)

(3) an isocyanurate moiety defined by the following structural formula:

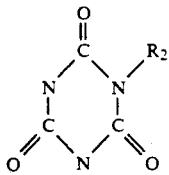
(Formula 5)

(4) a methylene or a methine radical;
(5) a maleate moiety defined by the following structural formula:

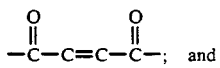
(Formula 6)

and (6) a mellitic derivatives defined by the following structural formula:

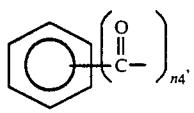
(Formula 7)

wherein:
A represents oxygen, sulfur or $NR^2$;
$R^1$ represents H, an alkyl group having from 1 to 8 carbon atoms, an aryl group, $N(R^2)_3$ or $CO_2R^2$;
$R^2$ represents, H, an alkyl group having from 1 to 8 carbon atoms or an aryl group or the Z group from Formula 1;
$n_1$ is the integer 2 or 3, preferably 3;
$n_2$ is the integer 0 or 1;
$n_3$ is the integer 2, 3 or 4, preferably 3; and
$n_4$ is the integer ranging from 2 to 6, preferably from 2 to 4.

Nonexclusive examples of such allylic compounds useful herein in the formulation of the unique composition of matter include diallyl maleate and diallyl phthalate. Of these, we prefer to use triallyl cyanurates, particularly triallyl cyanurate itself. The amount of allylic compound, or mixtures of such compounds, present in the unique composition of matter must be an amount sufficient to obtain the desired composite strength and panel clarity. The amount of allylic compound needed will range from about two to about 10 weight percent of the solids in the aqueous composition used in treating the fibers herein.

The presence of at least one $B-Zn_1$ allylic compound in the unique composition provides two possible reaction mechanisms for interfacial interaction between the treated glass fibers and thermosetting matrix polymers. One reaction is by reductive coupling while the other is by an oxidative mechanism. Reductive coupling involves the reaction through the unsaturated present in the unique composition on the glass fiber surface and the unsaturation of the thermosetting matrix polymer. In this way the glass fibers treated with the unique composition are interactable with the thermosetting polymers.

In addition to the required components needed to prepare the novel composition of matter herein, other components normally added to glass fiber sizing compositions can also be present, for example, antistatic agents, cross-linking agents (hardeners), antioxidants, etc. Non-exclusive examples of antistatic agents that can be used herein cationic organic alkoxylated quaternary ammonium salt antistatic agents, such as the material commercially available under the trade designation LAROSTAT 1084, available from PPG-Mazer. This material is characterized by its having a molecular weight of 1010 Mn and 1140 Mw, an acid number of 10-20 mgr KOH/p and a pH for one percent solution in water of 4 to 6. Further examples of antistatic agents for use herein, and the amounts thereof, that can be used, are exemplified in column 8, lines 62 to 68, column 9, lines 1 to 55, and column 10, lines 6 to 27, of U.S. Pat. No. 4,752,527 of Sanzero et al, which description is hereby incorporated herein by reference.

Non-exclusive examples of crosslinking agents that can be used herein include: monomers, dimers, trimers and higher oligomers of melamine formaldehyde and of hexakis/methyol-containing condensates. Further examples of crosslinking agents for use herein, and the amounts thereof that can be used, are exemplified in column 10, lines 39 to 68, and column 11, lines 1 to 15 of U.S. Pat. No. 4,752,527 to Sanzero et al, which description is hereby incorporated herein by reference.

Antioxidants can also be present as an optional component for the preparation of the unique composition herein and include hindered phenols, diaryl amines, thioethers, quinones and phosphates that have good compatibility with the above-defined film former and the polymer material in the polymeric matrices used in preparing the novel FRP composites. It is preferred to use antioxidants when the sized glass fibers are used to reinforce clear panels. Generally any of the antioxidants like those disclosed in U.S. Pat. No. 4,483,948, which is hereby incorporated by reference, can be used. Preferably the hindered phenols like butylated hydroxtoluene from Neville Sythes, Neville Island, Pittsburgh, Pa. and/or somewhat less preferred the thioethers are used in the unique composition to reduce the production of whitened fibers in a clear composite.

The amount of antioxidant, or mixtures of antioxidants, present in the novel composition of matter will be an amount sufficient to help maintain the desired clarity of the reinforcing polymeric matrices used to prepare the translucent panels herein. The amount of antioxidant needed will range from about 0.1 to about 10 percent of the solids in the aqueous composition used in treating the fibers herein.

The aqueous chemical treating composition has a sufficient amount of water to give a total solids for the composition that is sufficient to enable the glass fibers to be treated during their formation with the aqueous chemical treating composition. Generally, the total solids of the aqueous composition is in the range of about 1 to about 30 weight percent and preferably about 3 to about 10 percent. Preferably, the amounts of the solid components for an aqueous chemical treating composition should not exceed that amount which will cause the viscosity of the solution to be greater than about 100 centipoise at 20° C. Aqueous solutions having a viscosity of greater than 100 centipoise at 20° C. are very difficult to apply to glass fibers during their formation without breaking the fibers. It is most preferred that the viscosity of the size be between 1 and 20 centipoise at 20° C. for best results. Chemical treating compositions with thixotropic gelling or foaming agents can have known viscosities for gels and foams used to treat glass fibers. The pH of the aqueous chemical treating composition is below about 7, and preferably should be in a range of about 4.0 to about 6.0 to maintain the stability of the composition.

The aqueous chemical treating composition can be made by combining the above defined components simultaneously or sequentially. In a preferred embodiment, an aqueous solution is prepared by the addition of the allylic compound and the antioxidant, when used, to the film former with stirring. The hydrolyzed coupling agent is then added to the resulting mixture, followed by the solubilized lubricant and any additional desired components, for example, an antifoaming agent like SAG 10. The final pH of the aqueous chemical treating solution is then adjusted to be in the aforementioned range with a compatible acid, such as acetic acid.

The aqueous chemical treating composition can be applied to any fiberizable glass material such as "E-glass", "621-glass" and low or free boron and/or fluorine derivatives thereof and glass fiber compositions known as "A-glass", "C-glass" and "S-glass". It is preferred when preparing chemically treated glass fibers to be used in the manufacture of clear or translucent polymeric panels that the fiberizable glass compositions should result in glass fibers which give a blue hue or cast when they are used to reinforce the acrylic modified polyester matrix resins. Preferably, the glass fiber compositions give a refractive index for the glass fibers in the range of about 1.5495 to 1.5740. Higher refractive indecies for the glass give an undesirable bronze cast to clear panels reinforced with fibers. Most preferably the refractive index for the glass fibers is in the range of 1.5495 to 1.557.

The aqueous chemical treating composition can be applied to the glass fibers by any method known to those skilled in the art such as during the formation of the glass fibers after the glass fibers have cooled to a sufficient temperature to allow the application of the aqueous chemical treating composition. The aqueous chemical treating composition, typically referred to as a sizing composition, is applied to these glass fibers by applicators having belts, rollers, sprays and the like. Afterwards the treated glass fibers can be gathered into one or more strands and collected into a package commonly referred to as a forming package. Also, the glass fibers can be collected into one or more strands and chopped as a wet chopped product. The glass fibers can also be gathered into one or more strands and collected as a roving. The glass fibers are dried to reduce their moisture content, and preferably whatever the form of the chemically treated glass fibers, they are dried at temperature and time conditions equivalent to a temperature in the range of about 250° F. (121° C.) to less than 300° F. (149° C.) for 10-13 hours. The drying can be accomplished in any conventional glass fiber drying oven such as forced air ovens, dielectric ovens, and the like. The dried glass fibers have a dried residue of the aqueous chemical treating composition present on the surfaces of the glass fibers making up the strands. Preferably, the amount of the dried residue on the glass fibers is in the range of about 0.5 to about 2.0 weight percent LOI, preferably from about 0.5 to about 1.1 weight percent LOI (loss of ignition).

The dried glass fibers having the residue of the aqueous chemical treating composition can be used in any process for producing polymeric reinforced polymers such as in thermosetting polymers like unsaturated polyesters, vinyl esters and epoxies. Nonexclusive examples of thermosetting resins suitable for use in producing the composites herein include polyesters (or- thophthalic and isophthalic); modified polyesters, such as methyl methacrylate, neopentylglycol and acrylic modified derivatives thereof; vinyl esters, such as bisphenol-A, or epoxy novalac type; and epoxy polymers, such as EPON-826 (an epoxy prepared from bisphenol-A and a comonomer, such as epichlorohydrin).

One process in which the coated glass fibers are particularly suitable is the formation of clear or translucent acrylic modified polyester polymer glass fiber reinforced panels. With the high speed commercial operations used in producing glass fiber reinforced clear and translucent panels, the glass fibers with the dried residue of the aqueous chemical treating composition of the present invention is ideally suited. The glass fibers when chopped have very good wet-out in the polymeric matrix within the limitations of the high speed operation for producing the panels. The glass fibers with the dried residue of the aqueous chemical treating composition can be supplied to such an operation as dry chopped glass fiber strand or as roving which is then chopped into the polymeric matrix which is traveling on a conveyor belt on a releasable substrate such as cellophane. The chopped glass fiber strands are dispersed somewhat uniformly over the polymeric matrix and the glass fibers settle and become wet-out in the polymeric matrix. The glass fiber containing polymeric matrix is then cured in a suitable oven to produce the glass fiber reinforced panels. The panels have excellent clarity with little fiber prominence. The treated glass fibers of the present invention can be used in translucent, unfilled panel systems and also in filled systems such as those having about 12 to around 50 weight percent calcium carbonate filled, pigmented filled and other filled and unfilled polymeric matrix systems.

In the preferred embodiment of the present invention, glass fibers are attenuated from molten batch having a composition typical for E-type glass. Specifically, in the area suitable for the reinforcement of clear or translucent panels the composition will have a refractive index in the range of about 1.554 to 1.557 and have $B_2O_3$ concentration of around 5.2 percent by weight. The glass composition of the glass fibers is preferably in weight percent: $SiO_2-55.8$, $CaO-21$, $Al_2O_3-14.8$, $B_2O_3-5.2$, $Na_2O-1.4$ and $F_2-0.5$, along with trace amounts of materials usually present from batch compounds used to obtain the aforementioned components of the glass.

The glass fibers are coated with the aqueous chemical treating composition during the formation of the glass fibers from a multitude of orifices in a bushing of a glass-melting furnace by a belt type binder applicator. The aqueous chemical treating composition used for the panel application described hereinafter is a single aqueous emulsion having bisphenol polyester film forming polymer available from Savid under the trade designation Neoxil ™ 954 as the sole polymeric material for film formation. The bisphenol A polyester or esterified epoxy film forming polymer has a ratio of aliphatic unsaturation to aromatic unsaturation which is preferably less than 0.1 and which is most preferably around 0.07. The preferred silane coupling agent is the gamma methacryloxypropyltrimethoxy silane available from Union Carbide Corporation under the trade designation A174 silane, and the amount of the A174 silane is preferably in the range of about 2.5 to about 5 weight percent of the solids of the aqueous chemical treating composition. The water soluble cationic glass fiber lubricant is preferably the Emerylube ® 6717, which is present in an amount of about 1 to 2.5 weight percent of the solids of the aqueous chemical treating composition. The antistatic organic agent that is cationic quaternary ammonium salt with ethoxylation is the LAROSTAT 1084 antistat which is present as the sole antistat used in an effective amount of about 0.05 to about 0.15 weight percent of the aqueous treating composition. Also it is preferred to have present a strand hardening agent which is Resimene 841 melamine formaldehyde in an amount of around 0.1 to about 0.15 weight percent of the aqueous treating composition. The water which is present to make up the aqueous chemical treating composition is that amount to give a total solids content, up to around 6 and preferably around 5 to 6 weight percent of the aqueous chemical treating composition. The amount of the bisphenol A polyester resin is the remainder of the solids from the amounts of at least the coupling agent, lubricant, and allylic compound and preferably including an antistat and strand hardener. The pH of the aqueous chemical treating composition is preferably in the range of about 5.5 to about 6.2.

The aqueous chemical treating composition is prepared by hydrolyzing methacryloxypropyltrimethoxy silane with acetic acid in an amount of about one milliliter of acetic acid for about 20 grams of the silane in a premix tank. The hydrolyzation is performed by adding the acetic acid to about 10 to 20 weight percent of the water to be used in preparing the chemical treating composition and adding the silane to this mixture with stirring until complete hydrolyzation occurs. The cationic glass fiber lubricant is added to hot water (170° F.) with stirring where the amount of water is about 1 percent of the total amount of water used in preparing the aqueous chemical treating composition in a premix tank. The aqueous emulsion of the bisphenol polyester is about 46 percent solids is combined with a solution comprised of triallyl cyanurate and Evanstab 13 which is the di(tridecyl) thiodipropionate available from Grace organic chemical division, Evans Chemicals and then with about twice its weight of water in a main mix tank. The hydrolyzed silane and glass fiber lubricant are added to the main mix tank. The cationic organic ethoxylated quaternary ammonium salt antistatic agent is combined with warm water in about a 1 to 16 ratio and added to the main mix tank. Any melamine formaldehyde resin is combined with water in a ratio of about 1 to 300 and added to the main mix tank. A small amount of antifoaming agent like SAG 10 can be added and the mix, which has been agitated, is diluted to the final desired volume with water. The final pH of the aqueous chemical treating composition is then adjusted to be in the range of about 5.5 to about 6.2 with a compatible organic acid such as acetic acid.

Preferably, the aqueous chemical treating composition is applied to gray glass having a refractive index of about 1.555 during the formation of the glass fibers where the fibers have a diameter which can range from about $10.3 \times 10^{-5}$ to about $97.5 \times 10^{-5}$ inch, or more, and preferably from about $35 \times 10-5$ to about $40 \times 10-5$ inch. The aqueous chemical treating composition is applied in the glass fibers to give an add-on of the chemical treating composition in the range of about 0.5 to about 8 percent LOI (Loss of Ignition). The glass fibers are preferably G, H or K fibers gathered into strands to give constructions like G-67 (or H-55 or K-37 strand or the like. The strands of glass fibers are collected to form a package containing a plurality of ends. These formed packages are then dried in an oven at a temperature in the range of about 220° F. to 300° F. (104° C. to 149° C.) for about 10 to about 13 hours. These dried packages are then collected in a winder to produce a roving package. The roving can then be used in a process for producing clear or translucent acrylic polyester or epoxy panels by chopping the roving into chopped strand having a length of about 1/16 of an inch to 2 inches, preferably around 2 inches. The chopped strands fall into the matrix resin which is present on a moving conveyor with a release substrate such as cellophane separating the matrix from the conveyor belt. The chopped glass fiber strand containing matrix resin is conveyed to an oven where the panels are heated to cure. The fiber strand containing matrix resin, useful in preparing the novel panel herein, will contain from about 10 to about 35 weight percent of glass, preferably from about 15 to about 25 weight percent of glass fibers, based on the total weight of the matrix.

The aqueous chemical treating composition used for pultrusion rovings described hereinafter contains an aqueous emulsion of an epoxy resin, such as EPON 828, available from Shell Chemical Company, as the primary polymeric material for film formation. The epoxy resin has an epoxy equivalent weight in the range of about 180 to 190. The epoxy resin is emulsified with a combination of surfactants, which include Pluronic F-108 Poly(oxyethylene-oxypropylene) copolymer from BASF Corp., Emulphor EL-719 polyoxyethylated vegetable oil from GAF Corp., and Igepal CA-630 octyl phenoxypoly(ethyleneoxyethanol), also from GAF Corp., and heated to 150°-180° F., until all components are miscible. The mixture is mixed thoroughly under high shear using an Eppenback Mixer. A polyvinylpyrrolidone such as PVP K-30 available from GAF Corp. can be used as a secondary polymeric film former. The amount of PVP K-30 is preferably is the range of around 4.5 to around 12 weight percent of the solids in the aqueous treating composition. Under high shear mixing hot water (170° F.) is slowly added to invert the epoxy emulsion. The preferred silane coupling agents are gamma methacryloxypropyltrimethoxy and gamma aminopropyltriethoxy silanes available from Union Carbide Corporation under the trade designation A-174 and A-1100 silanes, respectively. The amount of the A174 silane is preferably in the range of about 5.0 to about 8.0 weight percent and A-1100 in the range of about 0.1 to about 0.5 weight percent of the solids of the aqueous chemical treating composition. The fiber lubricant is preferably Michemlube 723 wax emulsion, available from Michelman Chemical Inc., Cincinnati, Ohio, which is present in an amount of about 1.2 to about 13 weight percent of the solids of the aqueous chemical treating composition. The water which is present to make up the aqueous chemical treating composition is that amount to give a total solids content preferably around 10 to 15 weight percent of the aqueous chemical treating composition. The pH of the aqueous chemical treating composition is preferably in the range of about 4.0 to about 6.0.

For the pultrusion application the unique composition or size is prepared in a similar manner to that aforementioned manner for similar materials used in both types of sizes. The final pH of the aqueous chemical treating composition or size is then adjusted to be in the range of about 4.0 to about 6.0 with a compatible organic acid such as acetic acid.

Preferably, the size for the pultrusion application is applied to E-glass wherein the fibers have a diameter which can range from about 10 to about 95×10−5 inch, preferably about 50 to about 90×10−5 inch. The aqueous chemical treating composition is applied in the glass fibers to give an add-on of the chemical treating composition in the range of about 0.5 to about 8 percent LOI (Loss of Ignition). The glass fibers are preferably K through T fibers gathered into strands to give constructions like T-113 (or T-250 or K-675) strands or the like. The strands of glass fibers are collected to form a package containing a plurality of ends. These formed packages are then dried. The roving can then be used in a process for producing pultrusion profiles using unsaturated polyesters, vinyl esters or epoxies. The continuous rovings are impregnated in the desired resin mix and pulled through a hot die having the desired profile to cure the composite so obtained. The pultruded profile obtained herein will contain from about 50 to about 80 weight percent of glass, preferably from 70 to about 75 weight percent of glass fibers, based on the total weight of the matrix.

The invention and preferred embodiments are further illustrated by the following examples.

EXAMPLE 1

Four 100 gallon (378.54 liter) aqueous chemical treating compositions were prepared using the components set forth below in Table 1. Each of the compositions was used to treat glass fibers as described above in the preferred embodiment.

TABLE I

| Component | Composition 1 | Composition 2 | Composition 3 | Composition 4 |
|---|---|---|---|---|
| | Grams | | | |
| A 174 | 760 | 760 | 760 | 760 |
| Acetic Acid | 50 | 50 | 50 | 50 |
| Triallyl cyanurate | — | 500 | 1,500 | 500 |
| Evanstab 13 | — | — | — | 1,500 |
| Neoxil 954/D | 45,400 | 45,400 | 45,400 | 45,400 |
| Emery 6717 | 303 | 303 | 303 | 303 |
| LAROSTAT 1084 | 568 | 568 | 568 | 568 |
| Resimene 841 | 378 | 378 | 378 | 378 |

A 174 is the coupling agent gammamethacryloxypropyltrimethoxysilane. Evanstab 13 is a thioether, available from Evans Chemetrics. Neoxil 954/D is the film former as an aqueous emulsion of bisphenolic polyester resin, available from DSM Resins, Inc. Emery 6717 is a polyalkyleneimine lubricant, available from Emery Industries, Inc. LAROSTAT 1084 is the antistatic agent alkyldipolyoxyethylammonium ethyl sulfate, available from PPG-Mazer. Resimene 841 is the melamine-formaldehyde cross-linker, available from Monsanto.

The glass fibers had the glass compositions of the preferred embodiment and the filament diameters of H or K and were constructed into glass fiber strands having a construction of H-55 or K-37 which were dried at the temperatures of the preferred embodiment. The dried strands were chopped into lengths of about 2 inches. These dry chopped glass fiber strands were added to an acrylic polyester matrix like that available from Aristech Corp. under the trade designation Aristech type MR-17090 polyester resin with 5% MMA by the aforedescribed process to produce panels.

Table II below shows the performance characteristics of the chemically treated glass fibers using compositions containing triallyl cyanurate (Compositions 2, 3 and 4) and one not containing triallyl cyanurate (Composition 1) in the preparation of reinforced polymeric panels. Panels 1, 2, 3 and 4 therein correspond to panels prepared using glass fibers coated with Composition 1, 2, 3, 4, respectively.

TABLE II

PERFORMANCE RESULTS FOR PANELS PREPARED USING GLASS COATED WITH COMPOSITIONS 1, 2, 3 AND 4

| Panel | Chopping/Buildup | Two Hour Steam Test | Four Hour Steam Test | Flex Strength (ASTM-690) | | |
|---|---|---|---|---|---|---|
| | | | | Original | Final | % Retention |
| 1 | Good–Very Good | Excellent | Good | 21,920 | 16,100 | 73.4 |
| 2 | Very Good | Excellent | Very Good | — | — | — |
| 3 | Excellent | Excellent | Excellent | — | — | — |
| 4 | Very Good | Excellent | Very Good | 32,450 | 25,930 | 80.07 |

Chopping breakup relates to the amount of matchsticking occurring during chopping. Excellent means that no matchsticking was noted, while very good and good indicate the presence of 10 percent and 20 percent, respectively, or matchsticks. In the two hour and four hour steam tests, a portion of the panel was placed on top of a 400 ml pyrex beaker containing 300 ml of boiling deionized water for two hours and four hours, respectively. Excellent means that the panel was clear throughout the test periods. Very good indicated that the panel at the end of the test period showed a slight hazing but no presence of fiber bloom, while good indicated the beginning of fiber bloom.

It can be seen from the above flexural strength data for Panels 1 and 4, wherein the glass fibers were coated for Panel 1 with a composition without triallyl cyanurate while those for Panel 4 were coated with a composition containing triallyl cyanurate. The improved physical performances were obtained by Panel 4 over Panel 1, prepared with the composition containing no triallyl cyanurate.

EXAMPLE II

Four additional compositions were prepared first by combining EPON 880, Pluronic F-108, Emulphor EL-719 and Igepal CA-630 and heating to 140° F. to 160° F. with thorough mixing. When the desired temperature was obtained, high shear mixing was started, followed by slow addition of hot water to emulsify the epoxy resin. Heating was discontinued and triallyl cyanurate was added (only in Compositions 6, 7 and 8) to the epoxy emulsion under high shear mixing. A solution of PVP K-30 made with hot water was added to the epoxy mixture. A-174 and A-1100 silanes were hydrolyzed sequentially in acidified water and then added to the main mixture, after Michemlube 723 was added thereto.

TABLE III

| Component | Composition 5 | Composition 6 | Composition 7 | Composition 8 |
|---|---|---|---|---|
| | Grams Per Gallon | | | |
| EPON 800 | 231 | 222 | 216.8 | 212 |
| Pluronic F-108 | 23.1 | 22 | 21.7 | 21.2 |
| Emulphor El-719 | 23.1 | 22 | 21.7 | 21.2 |
| Igepal CA-630 | 11.6 | 11 | 10.8 | 10.6 |
| Triallyl cyanurate | — | 12 | 18 | 24 |
| PVP K-30 | 22 | 22 | 22 | 22 |

TABLE III-continued

| Component | Composition 5 | Composition 6 | Composition 7 | Composition 8 |
|---|---|---|---|---|
| | Grams Per Gallon | | | |
| A 174 | 32 | 32 | 32 | 32 |
| A 100 | 3.2 | 3.2 | 3.2 | 3.2 |
| Michemlube 723 | 100 | 100 | 100 | 100 |

Pultruded composites were fabricated from an isophthalic polyester resin mix, described below, with required number of tows of roving, each sized with one of the above formulations. The resin mix consisted of 10,000 grams of DION 8101 resin, (an isophthalic polyester resin), 100 grams of Zelec UN mold release, 2,400 grams of ASP 400P clay, 50 grams of Percadox 16N (a peroxycarbonate initiator obtained from AKZO Chemical Company), 50 grams of benzoyl peroxide initiator and 50 grams of t-butyl perbenzoate initiator.

The results obtained are tabulated below in Table IV.

TABLE IV

| | In-Plane Shear Strength (ksi) (ASTM) | Wet In-Plane* Shear Strength (ksi) (ASTM) | Flexural Shear Strength (ksi) (ASTM) |
|---|---|---|---|
| Composite Using Composition 5 | 4.71 | 5.15 | 142.6 |
| Composite Using Composition 6 | 5.29 | 5.47 | 154.4 |
| Composite Using Composition 7 | 5.78 | 6.25 | 159.8 |
| Composite Using Composition 8 | 6.02 | 6.37 | 164.0 |

*Subjected to 48 hours of continuous boiling water.

It can be seen from Table IV that in each instance when composites were prepared using glass fibers coated with a composition containing triallyl cyanurate the in-plane shear strength, the wet in-plane shear strength and flexural strength were much higher than composites similarly prepared but with no triallyl cyanurate in the treating composition.

We claim:

1. A chemical treating composition suitable for treating glass fibers comprising:
   (I) at least one film forming polymer,
   (II) at least one coupling agent,
   (III) at least one lubricant and
   (IV) at least one allylic compound in an amount to provide interfacial interaction between the treated glass fibers and thermosetting matrix polymers defined by the following structural formula:

$B\text{-}Z_{n1}$, wherein Z represents the following moiety:

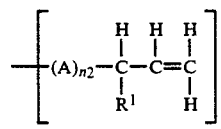

and B is selected from the group consisting of the following moieties:

(1) a cyanurate defined by the following structural formula:

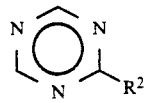

(2) an aromatic moiety defined by the following structural formula:

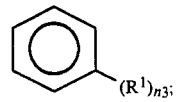

(3) an isocyanurate moiety defined by the following structural formula:

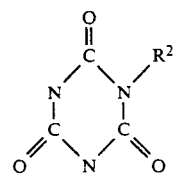

(4) a methylene or a methine radical;
   (5) a maleate moiety defined by the following structural formula:

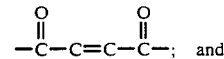

(6) a mellitic derivative defined by the following structural formula:

wherein
   A represents O, S or $NR_2$;
   $R_1$ represents H, an alkyl group having from 1 to 8 carbon atoms, an aryl group, $N(R^2)_3$;
   $R_2$ represents, H, an alkyl group having from 1 to 8 carbon atoms or an aryl group or the Z group from Formula 1;
   $n_1$ is the integer 2 or 3;
   $n_2$ is the integer 0 or 1;
   $n_3$ is the integer 2, 3 or 4; and
   $n_4$ is the integer ranging from 2 to 6.

2. The composition of claim 1, wherein B is a cyanurate defined by the following structural formula:

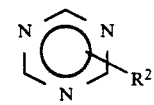

wherein $R_2$ is as defined in claim 1.

3. The composition of claim 1 which includes water in an effective amount for application of the chemical treating composition to the fibers during their formation.

4. The composition of claim 3 wherein said allylic compound is triallyl cyanurate present in an amount in the range of around 2 to around 10 weight percent of the solids of the aqueous composition.

5. The composition of claim 1 wherein said film former is selected from the group consisting of: one or more water soluble, dispersable or emulsifiable Bisphenol A polyesters and epoxy polymers and mixtures thereof present in an effective film forming amount.

6. The composition of claim 1 wherein said lubricant is selected from the group consisting of: cationic polyamino amides, wax emulsions and mixtures thereof, present in an effective fiber lubricating amount.

7. The composition of claim 1 wherein said coupling agent is an acryloxy-containing or methacryloxy-containing organo-functional compound present in an effective coupling agent amount.

8. A chemical treating composition suitable for treating glass fibers comprising: triallyl cyanurate, present in an amount in the range from around 2 to about 10 weight percent of the solids of an aqueous compositon, a film former which is one or more water soluble, dispersible or emulsifiable Bisphenol A polyesters present in an amount that comprises the remainder of the solids of the aqueous composition, a lubricant which is one or more cationic polyamino amides that is present in an amount in the range from around 1 to about 2.5 weight percent of the solids of the aqueous composition, a coupling agent which is an acryloxy-containing or methacryloxy-containing organo-functional compound that is present in an amount in the range from around 2.5 to about 5 weight percent of the solids of the aqueous composition, and water in an amount sufficient to give a solids content in the range of up to around 6 weight percent of the aqueous composition.

9. The composition of claim 1 wherein an antioxidant is also present.

10. The composition of claim 9 wherein said antioxidant is selected from the group consisting of: a hindered phenol, a diaryl amine or a thioether.

11. The composition of claim 9, wherein antioxidant is selected from the group consisting of alkylated hydroxyphenols including butylated hydroxytoluene and di(tridecyl) thiodipropionate about 0.1 to about 10 weight percent of the solids in the aqueous composition 12. The composition of claim 8 which includes an antistatic agent and a strand hardening agent in effective antistatic and strand hardening amounts, respectively.

13. The composition of claim 11 which includes an antistatic agent and a strand hardening agent in effective antistatic and strand hardening amounts, respectively.

14. A chemical treating composition suitable for treating glass fibers comprising: triallyl cyanurate present in an amount in the range from around 2 to about 10 weight percent of the solids of an aqueous composition, a film former which is one or more water soluble, dispersible or emulsifiable epoxy polymers present in an amount that comprises the remainder of the solids of the aqueous composition, one or more epoxy emulsifiers, a lubricant which is one or more wax emulsions that is present in an amount in the range from around 1.2 to about 13 weight percent of the solids of the aqueous composition, a coupling agent which is a mixture of an acryloxy-containing or methacryloxy-containing organo-functional compound that is present in an amount in the range from around 5 to about 8 weight percent of the solids of the aqueous composition and an amino alkyl trialkoxy silane, where the silanes are in unhydrolyzed, hydrolyzed or partially hydrolyzed form, and which includes polyvinylpyrrolidone as a second film forming polymer that is present in an amount in the range of around 4.5 to around 12 weight percent of the solids of the aqueous composition, where these components are present in these amounts when water is present in an amount that is sufficient to give a solids content in the range of up to around 6 weight percent of the aqueous composition.

15. Glass fibers having at least a portion of their surfaces covered with the dried residue of an aqueous composition containing the chemical treating composition if claim 1.

16. The glass fibers of claim 15 wherein said chemical treating composition is the chemical treating composition defined in claim 8.

17. The glass fibers of claim 15 wherein said chemical treating composition is the chemical treating composition defined in claim 14.

18. A process for producing thermosetting plastic composites which comprises combining one or more thermosetting resins and glass fibers having at least a portion of their surfaces covered with the dried residue of an aqueous composition containing the chemical treating composition of claim 1.

19. The process of claim 18 wherein said thermosetting resin is selected from the group consisting of unsaturated polyester resin, vinyl ester polymers and epoxy polymers.

20. A thermosetting plastic composite comprising one or more thermosetting resins and glass fibers having at least a portion of their surfaces covered with the dried residue of an aqueous composition containing the chemical treating composition of claim 1.

21. The thermosetting plastic composite of claim 20 wherein said thermosetting resin is selected from the group consisting of a unsaturated polyester resin, vinyl ester, and epoxy resin.

22. The thermosetting plastic composite of claim 21 wherein said dried residue is obtained from the aqueous chemical treating composition of claim 8.

23. The thermosetting plastic composite of claim 21 wherein said dried residue is obtained from the aqueous chemical treating composition of claim 13 to reduce the appearance of white fibers in clear panel composite.

24. The thermosetting plastic composite of claim 21 wherein said dried residue is obtained from the aqueous chemical treating composition of claim 14.

25. A chemical treating composition suitable for treating glass fibers comprising:
at most two film forming polymers selected from the group consisting of water soluble, dispersible or emulsifiable bisphenol A polyesters and epoxy polymers and mixtures thereof present in an effective film forming amount,
at least one coupling agent,
at least one lubricant and,
at least one allylic compound in an amount to provide interfacial interaction between the treated glass fibers and thermosetting matrix polymers defined by the following structural formula:

$$B-Z_{n1}.$$

wherein Z represents the following moiety:

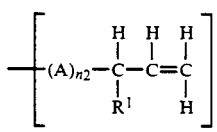

and B is selected from the group consisting of the following moieties:

(1) a cyanurate defined by the following structural formula:

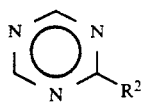

(2) an aromatic moiety defined by the following structural formula:

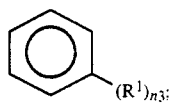

(3) an isocyanurate moiety defined by the following structural formula:

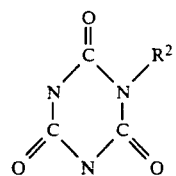

(4) a methylene or a methine radical;
(5) a maleate moiety defined by the following structural formula:

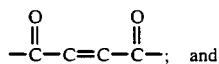 and (6) a mellitic derivative defined by the following structural formula:

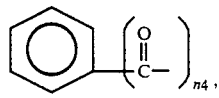

wherein
A represents O, S or $NR_2$;
$R_1$ represents $CO_2R^2$;
$R_2$ represents, H, an alkyl group having from 1 to 8 carbon atoms or an aryl group or the Z group from Formula 1;
$n_1$ is the integer 2 or 3;
$n_2$ is the integer 0 or 1;
$n_3$ is the integer 2, 3 or 4; and
$n_4$ is the integer ranging from 2 to 6.

* * * * *

UNITED STATES PATENT AND TRADEMARK OFFICE
CERTIFICATE OF CORRECTION

PATENT NO. : 5,219,656
DATED : June 15, 1993
INVENTOR(S) : Klett, et al.

It is certified that error appears in the above-identified patent and that said Letters Patent is hereby corrected as shown below:

Title page, item [56], Under "References Cited" on the face page of the patent, the cited U.S. Patents were not listed:

| | | | |
|---|---|---|---|
| U.S. Patent 4,409,597 | 9/77 | Motsinger | 260/18 |
| U.S. Patent 4,295,871 | 10/81 | Droux, et al. | 65/3 |
| U.S. Patent 4,341,877 | 7/82 | Das, et al. | 523/409 |
| U.S. Patent 4,483,948 | 11/84 | Tamosauskas | 523/205 |
| U.S. Patent 4,808,478 | 2/89 | Dana, et al. | 428/391 |
| U.S. Patent 4,981,754 | 1/91 | Hsu | 428/288 |

Signed and Sealed this

Seventeenth Day of May, 1994

Attest:

BRUCE LEHMAN

*Attesting Officer*   *Commissioner of Patents and Trademarks*